US011803583B2

(12) United States Patent
Das et al.

(10) Patent No.: US 11,803,583 B2
(45) Date of Patent: Oct. 31, 2023

(54) CONCEPT DISCOVERY FROM TEXT VIA KNOWLEDGE TRANSFER

(71) Applicant: Ohio State Innovation Foundation, Columbus, OH (US)

(72) Inventors: Manirupa Das, Powell, OH (US); Rajiv Ramnath, Columbus, OH (US); John Eric Fosler-Lussier, Columbus, OH (US)

(73) Assignee: Ohio State Innovation Foundation, Columbus, OH (US)

( * ) Notice: Subject to any disclaimer, the term of this patent is extended or adjusted under 35 U.S.C. 154(b) by 25 days.

(21) Appl. No.: 17/090,251

(22) Filed: Nov. 5, 2020

(65) Prior Publication Data

US 2021/0141823 A1 May 13, 2021

Related U.S. Application Data

(60) Provisional application No. 62/931,843, filed on Nov. 7, 2019.

(51) Int. Cl.
*G06F 16/35* (2019.01)
*G06F 16/33* (2019.01)
*G06F 16/93* (2019.01)

(52) U.S. Cl.
CPC ........ *G06F 16/355* (2019.01); *G06F 16/3346* (2019.01); *G06F 16/93* (2019.01)

(58) Field of Classification Search
CPC .... G06F 16/355; G06F 16/3346; G06F 16/93; G06N 20/00; G06N 3/08
See application file for complete search history.

(56) References Cited

U.S. PATENT DOCUMENTS

| 2007/0203885 | A1* | 8/2007 | Kim | G06F 40/30 |
| 2010/0094835 | A1* | 4/2010 | Lu | G06F 16/951 |
| | | | | 707/E17.143 |

(Continued)

OTHER PUBLICATIONS

Abadi, M., Barham, P., Chen, J., Chen, Z., Davis, A., Dean, J., Devin, M., Ghe-mawat, S., Irving, G., Isard, M., et al. (2016). Tensorflow: A system for large-scale machine learning. In 12th {USENIX} Symposium on Operating Systems Design and Implementation ({OSDI} 16), pp. 265-283.

(Continued)

*Primary Examiner* — Mariela Reyes
*Assistant Examiner* — Fatima P Mina
(74) *Attorney, Agent, or Firm* — Meunier Carlin & Curfman LLC

(57) ABSTRACT

Documents from a set of related documents in a domain are processed to identify keywords associated with each document. The documents are then further processed to identify the documents that are the most similar to each other. For each document, some or all of the keywords that are associated with the similar documents, but not the document itself, are selected as semantic tags for the document. These semantic tags determined for a document represent novel or hidden concepts and contexts that may relate to the document, but that do not actually appear in the document. The documents are used to train a model that generate semantic tags for a document or for keywords associated with the document. The generated model can then be used for a variety of purposes such the creation of an index for a set of documents or for query expansion.

14 Claims, 4 Drawing Sheets

(56) References Cited

U.S. PATENT DOCUMENTS

| | | | | |
|---|---|---|---|---|
| 2012/0310930 | A1* | 12/2012 | Kumar | G06F 16/345 |
| | | | | 707/E17.084 |
| 2013/0254190 | A1* | 9/2013 | Nakano | G06F 16/3322 |
| | | | | 707/727 |
| 2016/0019365 | A1* | 1/2016 | Ober, Jr. | G16H 50/70 |
| | | | | 705/2 |
| 2017/0147696 | A1* | 5/2017 | Evnine | G06F 16/9536 |
| 2018/0285459 | A1* | 10/2018 | Soni | G06F 16/93 |
| 2018/0300315 | A1* | 10/2018 | Leal | G06F 16/355 |
| 2019/0370396 | A1* | 12/2019 | Agnihotram | G06N 3/08 |

OTHER PUBLICATIONS

Ajakan, H., Germain, P., Larochelle, H., Laviolette, F., and Marchand, M. (2014). Domain-adversarial neural networks. arXiv preprint arXiv:1412.4446.

Alammar, J. (2018). The illustrated transformer. Online; posted Jun. 27, 2018.

Anick, P. G. and Tipirneni, S. (1999). The paraphrase search assistant: terminolog-ical feedback for iterative information seeking. In Proceedings of the 22nd annual international ACM SIGIR conference on Research and development in information retrieval, pp. 153-159. ACM.

Archambault, D., Hurley, N., and Tu, C. T. (2013). Churnvis: visualizing mobile telecommunications churn on a social network with attributes. In Advances in So-cial Networks Analysis and Mining (ASONAM), 2013 IEEE/ACM International Conference on, pp. 894-901. IEEE.

Athiwaratkun, B., Wilson, A. G., and Anandkumar, A. (2018). Probabilistic fasttext for multi-sense word embeddings. arXiv preprint arXiv: 1806.02901.

Azzini, A., Braghin, C., Damiani, E., and Zavatarelli, F. (2013). Using semantic lifting for improving process mining: a data loss prevention system case study. In SIMPDA, pp. 62-73.

Bahdanau, D., Cho, K., and Bengio, Y. (2014). Neural machine translation by jointly learning to align and translate. arXiv preprint arXiv:1409.0473.

Bajaj, P., Campos, D., Craswell, N., Deng, L., Gao, J., Liu, X., Majumder, R., McNamara, A., Mitra, B., Nguyen, T. and Rosenberg, M., 2016. Ms marco: A human generated machine reading comprehension dataset. arXiv preprint arXiv:1611.09268.

Banerjee, S. and Pedersen, T. (2002). An adapted lesk algorithm for word sense disambiguation using wordnet. In International Conference on Intelligent Text Processing and Computational Linguistics, pp. 136-145. Springer.

Barzilay, R. and McKeown, K. R. (2001). Extracting paraphrases from a parallel corpus. In Proceedings of the 39th annual meeting on Association for Computational Linguistics, pp. 50-57. Association for Computational Linguistics.

Barzilay, R., Mckeown, K. R., and Elhadad, M. (1999). Information fusion in the context of multi-document summarization. In Proceedings of the 37th annual meeting of the Association for Computational Linguistics on Computational Linguistics, pp. 550-557. Association for Computational Linguistics.

Ben-David, S., Blitzer, J., Crammer, K., Kulesza, A., Pereira, F., and Vaughan, J. W. (2010). A theory of learning from different domains. Machine learning, 79(1-2):151-175.

Bengio, Y., Ducharme, R., Vincent, P., and Jauvin, C. (2003). A neural probabilistic language model. Journal of machine learning research, 3(Feb):1137-1155.

Berger, A. L., Pietra, V. J. D., and Pietra, S. A. D. (1996). A maximum entropy approach to natural language processing. Computational linguistics, 22(1):39-71.

Bhagat, R. and Hovy, E. (2013). What is a paraphrase? Computational Linguistics, 39(3):463-472.

Bhagat, R. and Ravichandran, D. (2008). Large scale acquisition of paraphrases for learning surface patterns. In ACL, vol. 8, pp. 674-682.

Bhagat, R., Pantel, P., Hovy, E. H., and Rey, M. (2007). Ledir: An unsupervised algorithm for learning directionality of inference rules. In EMNLP-CONLL, pp. 161-170.

Bhatia, P., Arumae, K., and Celikkaya, B. (2018). Dynamic transfer learning for named entity recognition. arXiv preprint arXiv:1812.05288.

Bird, S. (2006). Nltk: the natural language toolkit. In Proceedings of the COLING/ACL on Interactive presentation sessions, pp. 69-72. Association for Computational Linguistics.

Blei, D. M., Ng, A. Y., and Jordan, M. I. (2003). Latent dirichlet allocation. Journal of machine Learning research, 3(Jan):993-1022.

Bodenreider, O. (2004). The unified medical language system (umls): integrating biomedical terminology. Nucleic acids research, 32(suppl 1):D267-D270.

Bojanowski, P., Grave, E., Joulin, A., and Mikolov, T. (2017). Enriching word vectors with subword information. Transactions of the Association for—Computational Linguistics, 5:135-146.

Bollacker, K., Evans, C., Paritosh, P., Sturge, T., and Taylor, J. (2008). Freebase: a collaboratively created graph database for structuring human knowledge. In Proceedings of the 2008 ACM SIGMOD international conference on Management of data, pp. 1247-1250. ACM.

Broder, A. (2002). A taxonomy of web search. In ACM Sigir forum, vol. 36, pp. 3-10. ACM.

Brown, P. F., Pietra, V. J. D., Mercer, R. L., Pietra, S. A. D., and Lai, J. C. (1992). An estimate of an upper bound for the entropy of english. Computational Linguistics, 18(1):31-40.

Callison-Burch, C., Koehn, P., and Osborne, M. (2006). Improved statistical machine translation using paraphrases. In Proceedings of the main conference on Human Language Technology Conference of the North American Chapter of the Association of Computational Linguistics, pp. 17-24. Association for Computational Linguistics.

Camacho-Collados, J., Bovi, C. D., Anke, L. E., Oramas, S., Pasini, T., Santus, E., Shwartz, V., Navigli, R., and Saggion, H. (2018). Semeval-2018 task 9: Hypernym discovery. In Proceedings of the 12th International Workshop on Semantic Evalua-tion, pp. 712-724.

Cao, G., Nie, J .- Y., Gao, J., and Robertson, S. (2008). Selecting good expansion terms for pseudo-relevance feedback. In Proceedings of the 31st annual international ACM SIGIR conference on Research and development in information retrieval, pp. 243-250. ACM.

Carey, S. (1999). Knowledge acquisition: Enrichment or conceptual change. Concepts: core readings, pp. 459-487.

Chen, L., Guan, Z., Zhao, W., Zhao, W., Wang, X., Zhao, Z., and Sun, H. (Jul. 17, 2019). Answer identification from product reviews for user questions by multi-task attentive networks.

Chen, W., Moosavinasab, S., Zemke, A., Prinzbach, A., Rust, S., Huang, Y., and Lin, S. (2016). Evaluation of a machine learning method to rank pubmed central articles for clinical relevancy: Nch at trec 2016 cds. TREC 2016 Clinical Decision Support Track.

Cheng, J. and Lapata, M. (2016). Neural summarization by extracting sentences and words. arXiv preprint arXiv:1603.07252.

Chin, S .- C. (2013). Knowledge transfer: what, how, and why. Iowa Research Online—Theses and Dissertations, 134 pages.

Chorowski, J. K., Bahdanau, D., Serdyuk, D., Cho, K., and Bengio, Y. (2015). Attention-based models for speech recognition. In Advances in neural information processing systems, pp. 577-585.

Chu, W. and Park, S .- T. (2009). Personalized recommendation on dynamic content using predictive bilinear models. In Proceedings of the 18th international conference on World wide web, pp. 691-700. ACM.

Chung, J., Gulcehre, C., Cho, K., and Bengio, Y. (2015). Gated feedback recurrent neural networks. In International Conference on Machine Learning, pp. 2067-2075.

Chung, J., Gulcehre, C., Cho, K., and Bengio, Y. (2014). Empirical evaluation of gated recurrent neural networks on sequence modeling. arXiv preprint arXiv:1412.3555.

Coussement, K. and Van den Poel, D. (2008). Churn prediction in subscription services: An application of support vector machines while comparing two parameter-selection techniques. Expert systems with applications, 34(1):313-327.

Csaji, B. C. (2001). Approximation with artificial neural networks. Faculty of Sciences, Etvs Lornd University, Hungary, 24:48.

(56) References Cited

OTHER PUBLICATIONS

Das, D. and Martins, A. F. (2007). A survey on automatic text summarization. Literature Survey for the Language and Statistics II course at CMU, 4(192-195):57.
Das, Manirupa, et al. "Towards methods for systematic research on big data." 2015 IEEE International Conference on Big Data (Big Data). IEEE, 2015.
Das, M., Cui, R., Campbell, D. R., Agrawal, G., and Ramnath, R. (2015a). Towards methods for systematic research on big data. In Big Data (Big Data), 2015 IEEE International Conference on, pp. 2072-2081. IEEE.
Das, M., Elsner, M., Nandi, A., & Ramnath, R. (May 2015). TopChurn: Maximum entropy churn prediction using topic models over heterogeneous signals. In Proceedings of the 24th International Conference on World Wide Web (pp. 291-297). ACM.
Das, M., Fosler-Lussier, E., Lin, S., Moosavinasab, S., Chen, D., Rust, S., Huang Y., & Ramnath, R. (Jul. 2018). Phrase2VecGLM: Neural generalized language model-based semantic tagging for complex query reformulation in medical IR. In Proceedings of the BioNLP 2018 workshop (pp. 118-128).
Das, M., Li J., Fosler-Lussier, E., Lin, S., Moosavinasab, S., Rust, S., Huang Y., & Ramnath, R. (2019) "Sequence-to-Set Semantic Tagging: End- to-End Multi-label Prediction using Neural Attention for Complex Query Reformulation and Automated Text Categorization". arXiv preprint, arXiv:1910.2898805, Nov. 11, 2019.
Das, M., Wang, Z., Jaffe, E., Chattopadhyay, M., Fosler-Lussier, E., & Ramnath, R. (2019). Learning to Answer Subjective, Specific Product-Related Queries using Customer Reviews by Neural Domain Adaptation. arXiv preprint arXiv:1910.08270, Oct. 22, 2019.
Daume III, H. (2004). Notes on cg and lm-bfgs optimization of logistic regression. Paper available at http://pub. hal3. name# daume04cg-bfgs, implementation available at http://hal3. name/megam, 198:282.
Dave, K. S., Vaingankar, V., Kolar, S., and Varma, V. (2013). Timespent based models for predicting user retention. In Proceedings of the 22nd international conference on World Wide Web, pp. 331-342. International World Wide Web Conferences Steering Committee.
De Bock, K. W. and Van den Poel, D. (2010). Ensembles of probability estimation trees for customer churn prediction. In Trends in Applied Intelligent Systems, pp. 57-66. Springer.
De Marneffe, M., MacCartney, B., Potts, C., and Jurafsky, D. (2015). Computational linguistics i lectures—lexical semantics. University Lecture.
De Vine, L., Zuccon, G., Koopman, B., Sitbon, L., and Bruza, P. (2014). Medical semantic similarity with a neural language model. In Proceedings of the 23rd ACM International Conference on Conference on Information and Knowledge Manage-ment, pp. 1819-1822. ACM.
Debeauvais, T., Nardi, B., Schiano, D. J., Ducheneaut, N., and Yee, N. (2011). If you build it they might stay: Retention mechanisms in world of warcraft. In Proceedings of the 6th International Conference on Foundations of Digital Games, pp. 180-187. ACM.
Deerwester, S. (1988). Improving information retrieval with latent semantic indexing. Deerwester, Scott, et al. "Improving information—retrieval with latent semantic indexing." Proceedings of the ASIS annual meeting. vol. 25. 143 Old Marlton Pike, Medford, NJ 08055-8750: Information Today Inc, 1988.
Deerwester, S., Dumais, S. T., Furnas, G. W., Landauer, T. K., and Harshman, R. (1990). Indexing by latent semantic analysis. Journal of the American society for information science, 41(6):391.
Diederik P Kingma and Jimmy Ba. 2014. Adam: A method for stochastic optimization. arXiv preprint arXiv:1412.6980.
Diekema, A., Yilmazel, O., Chen, J., Harwell, S., He, L., and Liddy, E. D. (2003). What do you mean? finding answers to complex questions. In New Directions in Question Answering, pp. 87-93.
Dina Demner-Fushman, Willie J Rogers, and Alan R Aronson. 2017. Metamap lite: an evaluation of a new java implementation of metamap. Journal 22 of the American Medical Informatics Association, 24(4):841-844.

Documentation, T. (2014). Textblob: Simplified text processing. URL http://textblob.readthedocs.org/en/dev/.
Donald AB Lindberg, Betsy L Humphreys, and Alexa T McCray. 1993. The unified medical language system. Yearbook of Medical Informatics, 2(01):41-51.
Dror, G., Pelleg, D., Rokhlenko, O., and Szpektor, I. (2012). Churn prediction in new users of yahoo! answers. In Proceedings of the 21st international conference companion on World Wide Web, pp. 829-834. ACM.
Espinosa-Anke, L., Camacho-Collados, J., Delli Bovi, C., and Saggion, H. (2016). Supervised distributional hypernym discovery via domain adaptation. In Conference on Empirical Methods in Natural Language Processing; Nov. 1-5, 2016; Austin, TX. Red Hook (NY): ACL; 2016. p. 424-35. ACL Association for Computational Lin-guistics).
Fader, Anthony, Luke Zettlemoyer, and Oren Etzioni. "Open question answering over curated and extracted knowledge bases." Proceedings of the 20th ACM SIGKDD international conference on Knowledge discovery and data mining. ACM, 2014.
Firth, J. R. (1957). A synopsis of linguistic theory, 1930-1955. Studies in linguistic analysis.
Furnas, G. W., Landauer, T. K., Gomez, L. M., and Dumais, S. T. (1983). Human factors and behavioral science: Statistical semantics: Analysis of the potential performance of keyword information systems. The Bell System Technical Journal, 62(6):1753-1806.
Ganguly, D., Roy, D., Mitra, M., and Jones, G. J. (2015a). A word embedding based generalized language model for information retrieval. In Proceedings of the 38th International ACM SIGIR Conference on Research and Development in Information Retrieval, pp. 795-798. ACM.
Ganin, Y. and Lempitsky, V. (2015). Unsupervised domain adaptation by backpropagation. In International Conference on Machine Learning, pp. 1180-1189.
Ganin, Y., Ustinova, E., Ajakan, H., Germain, P., Larochelle, H., Laviolette, F., Marc-hand, M., and Lempitsky, V. (2016). Domain-adversarial training of neural networks. Journal of Machine Learning Research, 17(59):1-35.
Gentner, D. (1983). Structure-mapping: A theoretical framework for analogy. Cognitive science, 7(2):155-170.
Gentner, D. (1989). Analogical learning. Similarity and analogical reasoning, 199.
Giuliano, C., Lavelli, A., and Romano, L. (2006). Exploiting shallow linguistic in-formation for relation extraction from biomedical literature. In EACL, vol. 18, pp. 401-408. Trento Italy.
Goldberg, Y. and Levy, O. (2014). word2vec explained: Deriving mikolov et al.'s negative-sampling word-embedding method. arXiv preprint arXiv:1402.3722.
Gormley, C. and Tong, Z. (2015). Elasticsearch: The Definitive Guide. "O'Reilly Media, Inc.".
Graves, A. (2013). Generating sequences with recurrent neural networks. arXiv preprint arXiv:1308.0850.
Griffiths, T. L. and Steyvers, M. (2004). Finding scientific topics. Proceedings of the National academy of Sciences, 101(suppl 1):5228-5235.
Group, T. S. N. L. P. (2014). Stanford topic modeling toolbox. URL http://nlp.stanford.edu/downloads/tmt/tmt-0.4/.
Halpin, H., Robu, V., and Shepherd, H. (2007). The complex dynamics of collaborative tagging. In Proceedings of the 16th international conference on World Wide Web, pp. 211-220. ACM.
Harabagiu, S. and Hickl, A. (2006). Methods for using textual entailment in open—domain question answering. In Proceedings of the 21st International Conference on Computational Linguistics and the 44th annual meeting of the Association for Com-putational Linguistics, pp. 905-912. Association for Computational Linguistics.
Harris, Z. S. (1954). Distributional structure. Word, 10(2-3):146-162.
Hassan, A. Z., Vallabhajosyula, M. S., and Pedersen, T. (2018). UMDuluth-CS8761 at SemEval-2018 task9: Hypernym discovery using hearst patterns, co- occurrence frequencies and word embeddings. In Proceedings of The 12th International Workshop on Semantic Evaluation, pp. 914-918, New Orleans, Louisiana. Association for Computational Linguistics.

(56) References Cited

OTHER PUBLICATIONS

Hearst, M. A. (1992). Automatic acquisition of hyponyms from large text corpora. In Proceedings of the 14th conference on Computational Linguistics—vol. 2, pp. 539-545. Association for Computational Linguistics.
Hendrickx, I., Kim, S. N., Kozareva, Z., Nakov, P., O Séaghdha, D., Padó, S., Pennacchiotti, M., Romano, L., and Szpakowicz, S. (2009). Semeval-2010 task 8: Multi-way classification of semantic relations between pairs of nominals. In Proceedings of the Workshop on Semantic Evaluations: Recent Achievements and Future Directions, pp. 94-99. Association for Computational Linguistics.
Hochreiter, S. and Schmidhuber, J. (1997). Long short-term memory. Neural computation, 9(8):1735-1780.
Hofmann, T. (1999). Probabilistic latent semantic analysis. In Proceedings of the Fifteenth conference on Uncertainty in artificial intelligence, pp. 289-296. Morgan Kaufmann Publishers Inc.
Holmes, G., Donkin, A., and Witten, I. H. (1994). Weka: A machine learning workbench. In Intelligent Information Systems, 1994. Proceedings of the 1994 Second Australian and New Zealand Conference on, pp. 357-361. IEEE.
Interactive Knowledge Stack, I. (2012). Lecture presentation—semantic lifting. [Online; posted Oct. 9, 2012].
Iwata, T., Saito, K., and Yamada, T. (2006). Recommendation method for extending subscription periods. In Proceedings of the 12th ACM SIGKDD international conference on Knowledge discovery and data mining, pp. 574-579. ACM.
Iyyer, M., Manjunatha, V., Boyd-Graber, J., and Daumé III, H. (2015). Deep unordered composition rivals syntactic methods for text classification. In Proceedings of the 53rd Annual Meeting of the Association for Computational Linguistics and the 7th International Joint Conference on Natural Language Processing (vol. 1: Long Papers), vol. 1, pp. 1681-1691.
Jin, X., Zhou, Y., and Mobasher, B. (2005). A maximum entropy web recommendation system: combining collaborative and content features. In Proceedings of the eleventh ACM SIGKDD international conference on Knowledge discovery in data mining, pp. 612-617. ACM.
Jinhyuk Lee, Wonjin Yoon, Sungdong Kim, Donghyeon Kim, Sunkyu Kim, Chan Ho So, and Jaewoo Kang. 2020. Advance Access Publication Date: Sep. 10, 2019. Biobert: a pre-trained biomedical language representation model for biomedical text mining. Bioinformatics, 36(4):1234-1240.
Kadlec, R., Bajgar, O., and Kleindienst, J. (2017). Knowledge base completion: Base-lines strike back. arXiv preprint arXiv:1705.10744.
Karnstedt, M., Rowe, M., Chan, J., Alani, H., and Hayes, C. (2011). The effect of user features on churn in social networks. In Proceedings of the 3rd International Web Science Conference, p. 23. ACM.
Kawale, J., Pal, A., and Srivastava, J. (2009). Churn prediction in mmorpgs: A social influence based approach. In Computational Science and Engineering, 2009. CSE'09. International Conference on, vol. 4, pp. 423-428. IEEE.
Kholghi, M., Sitbon, L., Zuccon, G., and Nguyen, A. (2015). Active learning: a step towards automating medical concept extraction. Journal of the American Medical Informatics Association, 23(2):289-296.
Kim, Y. (2014). Convolutional neural networks for sentence classification. arXiv preprint arXiv:1408.5882.
Kingma, D. P. and Ba, J. (2014). Adam: A method for stochastic optimization. arXiv preprint arXiv:1412.6980.
Kingsbury, P. and Palmer, M. (2002). From treebank to propbank. In LREC, pp. 1989-1993. Citeseer.
Kiros, R., Zhu, Y., Salakhutdinov, R. R., Zemel, R., Urtasun, R., Torralba, A., and Fidler, S. (2015). Skip-thought vectors. In Advances in neural information processing systems, pp. 3294-3302.
Klein, D. and Manning, C. (2003). Maxent models, conditional estimation, and opti-mization. HLT-NAACL 2003 Tutorial.
Kleinberg, J. M. (1999). Authoritative sources in a hyperlinked environment. Journal of the ACM (JACM), 46(5):604-632.
Krallinger, M. and Valencia, A. (2005). Text-mining and information—retrieval services for molecular biology. Genome biology, 6(7):224.
Krizhevsky, A., Sutskever, I., and Hinton, G. E. (2012). Imagenet classification with deep convolutional neural networks. In Advances in neural information processing systems, pp. 1097-1105.
Laine, S. and Aila, T. (2016). Temporal ensembling for semi-supervised learning. arXiv preprint arXiv:1610.02242.
Lample, G., Ballesteros, M., Subramanian, S., Kawakami, K., and Dyer, C. (2016). Neural architectures for named entity recognition. arXiv preprint arXiv:1603.01360.
Le, Q. V. and Mikolov, T. (2014). Distributed representations of sentences and documents. In ICML, vol. 14, pp. 1188-1196.
Lenat, D. B. (1995). Cyc: A large-scale investment in knowledge infrastructure. Communications of the ACM, 38(11):33-38.
Li, C., Datta, A., and Sun, A. (2011). Semantic tag recommendation using concept model. In Proceedings of the 34th international ACM SIGIR conference on Research and development in Information Retrieval, pp. 1159-1160. ACM.
Lin, D. and Pantel, P. (2001a). Discovery of inference rules for question-answering. Natural Language Engineering, 7(4):343-360.
Lin, D. and Pantel, P. (2001b). Induction of semantic classes from natural language text. In Proceedings of the seventh ACM SIGKDD international conference on Knowledge discovery and data mining, pp. 317-322. ACM.
Lin, D. and Pantel, P. (2002). Concept discovery from text. In Proceedings of the 19th international conference on Computational linguistic—vol. 1, pp. 1-7. Associ-ation for Computational Linguistics.
Liu, Z., Chen, X., and Sun, M. (2011). A simple word trigger method for social tag suggestion. In Proceedings of the Conference on Empirical Methods in Natural Language Processing, pp. 1577-1588. Association for Computational Linguistics.
Loria, S. (2014). Textblob: simplified text processing. Secondary TextBlob: Simplified Text Processing.
Luo, G., Tang, C., Yang, H., and Wei, X. (2008). Medsearch: a specialized search engine for medical information retrieval. In Proceedings of the 17th ACM conference on Information and knowledge management, pp. 143-152. ACM.
Manual, N. U. K. S. (2008). National library of medicine. Bethesda, Maryland.
Marcus, A., Wu, E., Karger, D. R., Madden, S., and Miller, R. C. (2011). Crowdsourced databases: Query processing with people. CIDR, 211-214.
Mathes, A. (2010). Folksonomies: Cooperative classification and communication through shared metadata, 2004. URL http://www.adammathes.com/academic/computer-mediated-communication/folksonomies.html.
McAuley, J. and Yang, A. (2016). Addressing complex and subjective product—related queries with customer reviews. In Proceedings of the 25th International Conference on World Wide Web, pp. 625-635. International World Wide Web Conferences Steering Committee.
Medin, D. L. (1989). Concepts and conceptual structure. American psychologist, 44(12):1469.
Medin, D. L., Goldstone, R. L., and Gentner, D. (1993). Respects for similarity. Psychological review, 100(2):254.
Mikolov, Kai Chen, Greg Corrado, and Jeffrey Dean. 2013a. Efficient estimation of word representations in vector space. arXiv preprint arXiv:1301.3781.
Mikolov, T., Sutskever, I., Chen, K., Corrado, G. S., and Dean, J. (2013b). Distributed representations of words and phrases and their compositionality. In Advances in neural information processing systems, pp. 3111-3119.
Miller, G. A. (1995). Wordnet: a lexical database for english. Communications of the ACM, 38(11):39-41.
Miller, G. A. and Charles, W. G. (1991). Contextual correlates of semantic similarity. Language and cognitive processes, 6(1):1-28.
Minsky, M. (1991). Society of mind: a response to four reviews. Artificial Intelligence, 48(3):371-396.
Mintz, M., Bills, S., Snow, R., and Jurafsky, D. (2009). Distant supervision for relation extraction without labeled data. In Proceedings of the Joint Conference of the 47th Annual Meeting of the ACL

(56) References Cited

OTHER PUBLICATIONS and the 4th International Joint Conference on Natural Language Processing of the AFNLP: vol. 2-vol. 2, pp. 1003-1011. Association for Computational Linguistics.
Mitchell, T. M., Cohen, W. W., Hruschka Jr, E. R., Talukdar, p. P., Betteridge, J., Carlson, A., Mishra, B. D., Gardner, M., Kisiel, B., Krishnamurthy, J., et al. (2015). Never ending learning. In AAAI, pp. 2302-2310.
Moldovan, D., Pasca, M., Harabagiu, S., and Surdeanu, M. (2003). Performance issues and error analysis in an open-domain question answering system. ACM Transactions on Information Systems (TOIS), 21(2):133-154.
Mooney, R. J. and Roy, L. (2000). Content-based book recommending using learning for text categorization. In Proceedings of the fifth ACM conference on Digital libraries, pp. 195-204. ACM.
Nandi, A. and Bernstein, P. A. (2009). Hamster: using search clicklogs for schema and taxonomy matching. Proceedings of the VLDB Endowment, 2(1):181-192.
Neubig, G. (2017). Neural machine translation and sequence-to-sequence models: A tutorial. arXiv preprint arXiv:1703.01619.
Newman, D., Chemudugunta, C., Smyth, P., and Steyvers, M. (2006). Analyzing entities and topics in news articles using statistical topic models. In Intelligence and Security Informatics, pp. 93-104. Springer.
Nivre, J., De Marneffe, M .-C., Ginter, F., Goldberg, Y., Hajic, J., Manning, C. D., McDonald, R., Petrov, S., Pyysalo, S., Silveira, N., et al. (2016). Universal dependencies v1: A multilingual treebank collection. In Proceedings of the Tenth International Conference on Language Resources and Evaluation (LREC 2016), pp. 1659-1666.
Osgood, C. E. (1949). The similarity paradox in human learning: A resolution. Psy-chological review, 56(3):132.
Palangi, H., Deng, L., Shen, Y., Gao, J., He, X., Chen, J., Song, X., and Ward, R. (2016). Deep sentence embedding using long short-term memory networks: Analysis and application to information retrieval. IEEE/ACM Transactions on Audio, Speech and Language Processing (TASLP), 24(4):694-707.
Pan, S. J. and Yang, Q. (2010). A survey on transfer learning. IEEE Transactions on knowledge and data engineering, 22(10):1345-1359.
Pantel, P., Bhagat, R., Coppola, B., Chklovski, T., and Hovy, E. H. (2007). Isp: Learning inferential selectional preferences. In HLT-NAACL, pp. 564-571.
Peng, Shankai Yan, and Zhiyong Lu. 2019. Transfer learning in biomedical natural language processing: An evaluation of BERT and ELMo on ten benchmarking datasets. In Proceedings of the 2019 Workshop on Biomedical Natural Language Processing (BioNLP Jun. 18, 2019), pp. 58-65.
Peters, M. E., Neumann, M., Iyyer, M., Gardner, M., Clark, C., Lee, K., and Zettlemoyer, L. (Mar. 22, 2018). Deep contextualized word representations. arXiv preprint arXiv:1802.05365.
Petrov, S. and McDonald, R. (2012). Overview of the 2012 shared task on parsing the web. 8 pages.
Pew Research Centers, J. P. a. (2013). Newspapers turning ideas into dollars. 4 pages.
Pfeiffer, J., Broscheit, S., Gemulla, R., and Göschl, M. (Jul. 19, 2018). A neural autoencoder approach for document ranking and query refinement in pharmacogenomic informa-tion retrieval. In Proceedings of the BioNLP 2018 workshop, pp. 87-97.
Porteous, I., Newman, D., Ihler, A., Asuncion, A., Smyth, P., and Welling, M. (2008). Fast collapsed gibbs sampling for latent dirichlet allocation. In Proceedings of the 14th ACM SIGKDD international conference on Knowledge discovery and data mining, pp. 569-577. ACM.
Rehurek, R. and Sojka, P. (2010a). Software Framework for Topic Modelling with Large Corpora. In Proceedings of the LREC 2010 Workshop on New Challenges for NLP Frameworks, pp. 46-50, Valletta, Malta. ELRA. http://is.muni.cz/publication/884893/en.
Radev, D., Winkel, A., and Topper, M. (2002). Multi document centroid-based text summarization. In ACL 2002. Citeseer.
Radford, Alec, et al. "Improving language understanding by generative pre-training." (2018).
Rajpurkar, P., Zhang, J., Lopyrev, K., and Liang, P. (2016). Squad: 100,000+ questions for machine comprehension of text. arXiv preprint arXiv:1606.05250.
Ramage, D., Manning, C. D., and Dumais, S. (2011). Partially labeled topic models for interpretable text mining. In Proceedings of the 17th ACM SIGKDD international conference on Knowledge discovery and data mining, pp. 457-465. ACM.
Ravichandran, D. and Hovy, E. (2002). Learning surface text patterns for a question answering system. In Proceedings of the 40th annual meeting on association for computational linguistics, pp. 41-47. Association for Computational Linguistics.
Resnick, P., Iacovou, N., Suchak, M., Bergstrom, P., and Riedl, J. (1994). Grouplens: an open architecture for collaborative filtering of netnews. In Proceedings of the 1994 ACM conference on Computer supported cooperative work, pp. 175-186. ACM.
Resnik, P. (1996). Selectional constraints: An information— theoretic model and its computational realization. Cognition, 61(1):127-159.
Ritter, A., Soderland, S., and Etzioni, O. (2009). What is this, anyway: Automatic hypernym discovery. In AAAI Spring Symposium: Learning by Reading and Learning to Read, pp. 88-93.
Ritter, A., Zettlemoyer, L., Etzioni, O., et al. (2013). Modeling missing data in distant supervision for information extraction. Transactions of the Association for Compu-tational Linguistics, 1:367-378.
Rivas, A. R., Iglesias, E. L., and Borrajo, L. (2014). Study of query expansion tech-niques and their application in the biomedical information retrieval. The Scientific World Journal, 2014.
Roberts, Anupama E Gururaj, Xiaoling Chen, Saeid Pournejati, William R Hersh, Dina Demner-Fushman, Lucila Ohno-Machado, Trevor Cohen, and Hua Xu. 2017. Information retrieval for biomedical datasets: the 2016 biocaddie dataset retrieval challenge. Database, 2017, 9 pages.
Roberts, Ellen Voorhees, Dina Demner-Fushman, and William R. Hersh. 2016. Overview of the TREC 2016 clinical decision support track. Online; posted Aug. 2016, 14 pages.
Roberts, K., Simpson, M. S., Voorhees, E. M., and Hersh, W. R. (2016a). Overview of the TREC 2015 clinical decision support track. In TREC, 12 pages.
Rocktaschel, T., Grefenstette, E., Hermann, K. M., Kočiský, T., and Blunsom, P. (2015). Reasoning about entailment with neural attention. arXiv preprint arXiv:1509.06664. 9 pages.
Roediger, H. L. (1990). Implicit memory: Retention without remembering. American psychologist, 45(9):1043.
Ruder, S. (Feb. 2019). Neural Transfer Learning for Natural Language Processing. PhD thesis, National University of Ireland, Galway, 329 pages.
Rumelhart, D. E., Hinton, G. E., Williams, R. J., et al. (1988). Learning representations by back-propagating errors. Cognitive modeling, 5(3):1.
Rush, A. M., Chopra, S., and Weston, J. (2015). A neural attention model for abstractive sentence summarization. arXiv preprint arXiv:1509.00685.
Salton, G., Buckley, C., and Smith, M. (1990). On the application of syntactic methodologies in automatic text analysis. Information Processing & Management, 26(1):73-92.
Salton, G., Wong, A., and Yang, C .- S. (1975). A vector space model for automatic indexing. Communications of the ACM, 18(11):613-620.
Sebastiani, F. (2002). Machine learning in automated text categorization. ACM computing surveys (CSUR), 34(1):1-47.
Shannon, C. E. (1948). A mathematical theory of communication. Bell system technical journal, 27(3):379-423.
Sharp, R., Surdeanu, M., Jansen, P., Clark, P., and Hammond, M. (2016). Creating causal embeddings for question answering with minimal supervision. arXiv preprint arXiv:1609.08097.
Shimaoka, S., Stenetorp, P., Inui, K., and Riedel, S. (2016). Neural architectures for fine-grained entity type classification. arXiv preprint arXiv:1606.01341.

(56) References Cited

OTHER PUBLICATIONS

Shneiderman, B., Byrd, D., and Croft, W. B. (1997). Clarifying search: A user-interface framework for text searches. D-lib magazine, 3(1):18-20.

Shwartz, V., Santus, E., and Schlechtweg, D. (Jan. 8, 2017). Hypernyms under siege: Linguisticallymotivated artillery for hypernymy detection. arXiv preprint arXiv:1612.04460.

Silvestri, F. (2010). Mining query logs: Turning search usage data into knowledge. Foundations and Trends in Information Retrieval, 4(1-2):1-174.

Singh, G. and Bhatia, P. (Feb. 25, 2019). Relation extraction using explicit context conditioning. arXiv preprint arXiv:1902.09271.

Soleimani, H. and Miller, D. J. (2016). Semi-supervised multi-label topic models for document classification and sentence labeling. In Proceedings of the 25th ACM international on conference on information and knowledge management, pp. 105-114. ACM.

Song, Y., Kim, E., Lee, G. G., and Yi, B .-K. (2005). Posbiotm-ner: a trainable biomedical named-entity recognition system. Bioinformatics, 21(11):2794-2796.

Sordoni, A., Bengio, Y., and Nie, J .-Y. (2014). Learning concept embeddings for query expansion by quantum entropy minimization. In AAAI, vol. 14, pp. 1586-1592.

Sparck Jones, K. (1972). A statistical interpretation of term specificity and its application in retrieval. Journal of documentation, 28(1):11-21.

Spelke, E. S. (1990). Principles of object perception. Cognitive science, 14(1):29-56.

Steyvers, M. and Griffiths, T. (2007). Probabilistic topic models. Handbook of latent semantic analysis, 427(7):424-440.

Su, Y., Yang, S., Sun, H., Srivatsa, M., Kase, S., Vanni, M., and Yan, X. (2015). Exploiting relevance feedback in knowledge graph search. In Proceedings of the 21th ACM SIGKDD International Conference on Knowledge Discovery and Data Mining, pp. 1135-1144. ACM.

Sukhbaatar, S., Weston, J., Fergus, R., et al. (2015). End-to-end memory networks. In Advances in neural information processing systems, pp. 2440-2448.

Sutskever, I., Vinyals, O., and Le, Q. V. (2014). Sequence to sequence learning with neural networks. In Advances in neural information processing systems, pp. 3104-3112.

Szabo, Z. G. (2017). Compositionality. In Zalta, E. N., editor, The Stanford Encyclopedia of Philosophy. Metaphysics Research Lab, Stanford University, summer 2017 edition.

Szpektor, I., Tanev, H., Dagan, I., and Coppola, B. (2004). Scaling web-based acquisition of entailment relations. In Proceedings of the 2004 Conference on Empirical Methods in Natural Language Processing.

Tarng, P .-Y., Chen, K .-T., and Huang, P. (2009). On prophesying online gamer de-parture. In Network and Systems Support for Games (NetGames), 2009 8th Annual Workshop on, pp. 1-2. IEEE.

Taylor, A., Marcus, M., and Santorini, B. (2003). The Penn treebank: an overview. In Treebanks, 18 pages. Springer.

Teo, C. H., Nassif, H., Hill, D., Srinivasan, S., Goodman, M., Mohan, V., and Vish-wanathan, S. (2016). Adaptive, personalized diversity for visual discovery. In Pro-ceedings of the 10th ACM Conference on Recommender Systems, pp. 35-38. ACM.

Thomason, R. H. (2012). What is semantics? Richard H. Thomason's UMich EECS Departmental Homepage.

Tuarob, S., Pouchard, L. C., and Giles, C. L. (2013). Automatic tag recommendation for metadata annotation using probabilistic topic modeling. In Proceedings of the 13th ACM/IEEE-CS joint conference on Digital libraries, pp. 239-248. ACM.

Turney, P. D. (2005). Measuring semantic similarity by latent relational analysis. arXiv preprint cs/0508053.

Turney, P. D. and Littman, M. L. (2003). Measuring praise and criticism: Inference of semantic orientation from association. ACM Transactions on Information Systems (TOIS), 21(4):315-346.

Turney, P. D. and Pantel, P. (2010). From frequency to meaning: Vector space models of semantics. Journal of artificial intelligence research, 37:141-188.

Vaswani, A., Shazeer, N., Parmar, N., Uszkoreit, J., Jones, L., Gomez, A. N., Kaiser, L., and Polosukhin, I. (2017). Attention is all you need. In Advances in Neural Information Processing Systems, pp. 5998-6008.

Verga, P., Strubell, E., Shai, O., and McCallum, A. (2017). Attending to all mention pairs for full abstract biological relation extraction. arXiv preprint arXiv:1710.08312.

Voorhees, E. M. (2014). The effect of sampling strategy on inferred measures. In Proceedings of the 37th international ACM SIGIR conference on Research & devel-opment in information retrieval, pp. 1119-1122. ACM.

Vulíc, I., Gerz, D., Kiela, D., Hill, F., and Korhonen, A. (Dec. 8, 2017). Hyperlex: A large-scale evaluation of graded lexical entailment. Computational Linguistics, 43(4):781-835.

Wan, M. and McAuley, J. (2016). Modeling ambiguity, subjectivity, and diverging viewpoints in opinion question answering systems. In Data Mining (ICDM), 2016 IEEE 16th International Conference on, pp. 489-498. IEEE.

Wei, C., Lee, H., Molnar, L., Herold, M., Ramnath, R., and Ramanathan, J. (2013). Assisted human-in-the-loop adaptation of web pages for mobile devices. In Computer Software and Applications Conference (COMPSAC), 2013 IEEE 37th Annual, pp. 118-123. IEEE.

Wilks, Y. (1973). Preference semantics. Technical report, Stanford Univ CA Dept of Computer Science.

Wities, R., Shwartz, V., Stanovsky, G., Adler, M., Shapira, O., Upadhyay, S., Roth, D., Martínez-Cámara, E., Gurevych, I., and Dagan, I. (2017). A consolidated open knowledge representation for multiple texts. In Proceedings of the 2nd Workshop on Linking Models of Lexical, Sentential and Discourse-level Semantics, pp. 12-24.

Xu, J. and Croft, W. B. (2000). Improving the effectiveness of information retrieval with local context analysis. ACM Transactions on Information Systems (TOIS), 18(1):79-112.

Xu, B., Lin, H., Lin, Y., and Xu, K. (2017). Learning to rank with query-level semi-supervised autoencoders. In Proceedings of the 2017 ACM on Conference on Infor-mation and Knowledge Management, pp. 2395-2398. ACM.

Xu, K., Ba, J., Kiros, R., Cho, K., Courville, A., Salakhudinov, R., Zemel, R., and Bengio, Y. (2015). Show, attend and tell: Neural image caption generation with visual attention. In International conference on machine learning, pp. 2048-2057.

Xu, W., Ritter, A., Callison-Burch, C., Dolan, W. B., and Ji, Y. (2014). Extracting lexically divergent paraphrases from twitter. Transactions of the Association for Computational Linguistics, 2:435-448.

Yang, Y., Bansal, N., Dakka, W., Ipeirotis, P., Koudas, N., and Papadias, D. (2009). Query by document. In Proceedings of the Second ACM International Conference on Web Search and Data Mining, pp. 34-43. ACM.

Yin, W., Schütze, H., Xiang, B., and Zhou, B. (2015). Abcnn: Attention—based convolutional neural network for modeling sentence pairs. arXiv preprint arXiv:1512.05193.

Yu, Q. and Lam, W. (2018). Review-aware answer prediction for product-related questions incorporating aspects. In Proceedings of the Eleventh ACM International Conference on Web Search and Data Mining, pp. 691-699. ACM.

Zhai, C. and Lafferty, J. (2004). A study of smoothing methods for language models applied to information retrieval. ACM Transactions on Information Systems (TOIS), 22(2):179-214.

Zhang, Y., Rahman, M. M., Braylan, A., Dang, B., Chang, H .-L., Kim, H., McNamara, Q., Angert, A., Banner, E., Khetan, V., et al. (2016). Neural information retrieval: A literature review. arXiv preprint arXiv:1611.06792.

Zhang, Z., Li, J., Zhao, H., and Tang, B. (May 26, 2018). Sjtu-nlp at semeval-2018 task 9: Neural hypernym discovery with term embeddings. arXiv preprint arXiv:1805.10465.

Zuccon, G., Koopman, B., Bruza, P., and Azzopardi, L. (2015). Integrating and evaluating neural word embeddings in information retrieval. In Proceedings of the 20th Australasian Document Computing Symposium, p. 12. ACM.

* cited by examiner

CONCEPT DISCOVERY FROM TEXT VIA KNOWLEDGE TRANSFER

CROSS-REFERENCE TO RELATED APPLICATIONS

This application claims the benefit of U.S. provisional patent application No. 62/931,843, filed on Nov. 7, 2019, and entitled "CONCEPT DISCOVERY FROM TEXT VIA KNOWLEDGE TRANSFER," the disclosure of which is expressly incorporated herein by reference in its entirety.

BACKGROUND

Traditional knowledge graphs driven by knowledge bases can represent facts about and capture relationships among entities very well, thus performing quite accurately in fact-based information retrieval or question answering. However, novel contexts consisting of a new set of terms referring to one or more concepts, may appear in a real-world querying scenario in the form of a natural language question or a search query into a document retrieval system. These may not directly refer to existing entities or surface form concepts occurring in the relations within a knowledge base. Thus, in addressing these novel contexts, such as those appearing in nuanced subjective queries, these systems can fall short. This is because hidden relations meaningful in the current context may exist in a collection between candidate latent concepts or entities that have different surface realizations via alternate lexical forms, but which are not currently present in a curated knowledge source such as a knowledge base or an ontology.

It is with respect to these and other considerations that the various aspects and embodiments of the present disclosure are presented.

SUMMARY

Documents from a set of related documents in a domain are processed to identify keywords associated with each document. The documents are then further processed to identify the documents that are the most similar to each other. For each document, some or all of the keywords that are associated with the similar documents, but not the document itself, are selected as semantic tags for the document. These semantic tags determined for a document represent novel or hidden concepts and contexts that may relate to the document, but that do not actually appear in the document. The semantic tags and the documents are used to train a model that generates semantic tags for a document or for keywords associated with the document. The generated model can then be used for a variety of purposes such the creation of an index for a set of documents or for query expansion.

In an embodiment, a method for determining semantic tags for a document is provided. The method includes: receiving a set of documents by a computing device, wherein each document in the set of documents comprises a first set of keywords; for each document in the set of documents, determining one or more documents of the set of documents that are similar to the document by the computing device; and for each document in the set of documents, based on one or more documents that are similar to the document, determining a second set of keywords for the document by the computing device.

Embodiments may have some or all of the following features. The second set of keywords may be semantic tags. For each document, the second set of keywords may be different than the first set of keywords. The method may further include training a model using the first set of keywords determined for each document. The method may further include: receiving a document, wherein the document is not in the first set of documents; and determining one or more semantic tags for the document using the model. Each document of the set of documents may include a plurality of terms. The method may further include, for each document of the set of documents, generating the first set of keywords by: computing a frequency for each term of the plurality of terms; and selecting the first set of keywords from the terms of the plurality of terms based on the computed frequencies. Computing the frequency for a term may include computing the term frequency-inverse document frequency ("TFIDF") for the term. For each document of the plurality of documents, determining the second set of keywords for the document may include: determining keywords from the first set of keywords associated with each of the one or more similar documents that are not in the first set of keywords associated with the document, and generating the second set of keywords based on the determined keywords. Determining one or more documents of the set of documents that are similar to the document may include determining the one or more documents using a cosine similarity-based function.

In an embodiment, a system for determining semantic tags for a document is provided. The system includes: at least one computing device; and a memory storing instructions that when executed by the at least one computing device cause the at least one computing device to: receive a set of documents, wherein each document in the set of documents comprises a first set of keywords; for each document in the set of documents, determine one or more documents of the set of documents that are similar to the document; and for each document in the set of documents, based on one or more documents that are similar to the document, determine a second set of keywords for the document.

Embodiments may include some or all of the following features. The second set of keywords may be semantic tags. For each document, the second set of keywords may be different than the first set of keywords. The instructions may further include instructions that when executed by the at least one computing device cause the at least one computing device to train a model using the first set of keywords determined for each document. The instructions may further include instructions that when executed by the at least one computing device cause the at least one computing device to: receive a document, wherein the document is not in the first set of documents; and determine one or more semantic tags for the document using the model.

In an embodiment, a computer-readable medium is provided. The computer-readable medium may store instructions that when executed by at least one computing device cause the at least one computing device to: receive a set of documents, wherein each document in the set of documents comprises a first set of keywords; for each document in the set of documents, determine one or more documents of the set of documents that are similar to the document; and for each document in the set of documents, based on one or more documents that are similar to the document, determine a second set of keywords for the document.

Embodiments may include some or all of the following features. The second set of keywords may be semantic tags. For each document, the second set of keywords may be different than the first set of keywords. The instructions may include instructions that when executed by the at least one computing device cause the at least one computing device to train a model using the first set of keywords determined for each document. The instructions may include instructions that when executed by the at least one computing device cause the at least one computing device to: receive a document, wherein the document is not in the first set of documents; and determine one or more semantic tags for the document using the model. Determining one or more documents of the set of documents that are similar to the document may include determining the one or more documents using a cosine similarity-based function.

This summary is provided to introduce a selection of concepts in a simplified form that are further described below in the detailed description. This summary is not intended to identify key features or essential features of the claimed subject matter, nor is it intended to be used to limit the scope of the claimed subject matter.

BRIEF DESCRIPTION OF THE DRAWINGS

The foregoing summary, as well as the following detailed description of illustrative embodiments, is better understood when read in conjunction with the appended drawings. For the purpose of illustrating the embodiments, there is shown in the drawings example constructions of the embodiments; however, the embodiments are not limited to the specific methods and instrumentalities disclosed. In the drawings.

DETAILED DESCRIPTION

Figure 1:
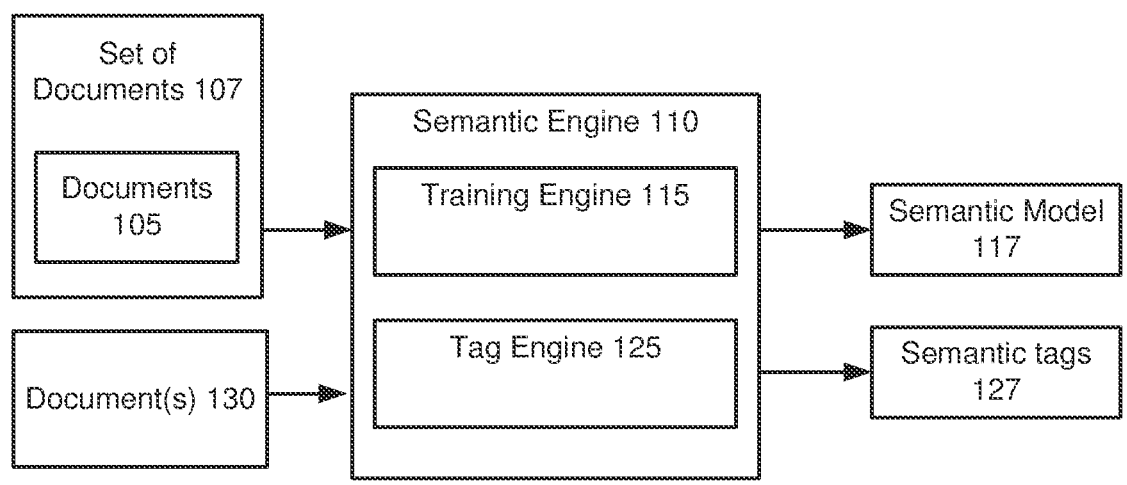
FIG. 1 is an illustration of an environment for an example semantic engine for determining semantic tags for one or more documents.

This description provides examples not intended to limit the scope of the appended claims. The figures generally indicate the features of the examples, where it is understood and appreciated that like reference numerals are used to refer to like elements. Reference in the specification to "one embodiment" or "an embodiment" or "an example embodiment" means that a particular feature, structure, or characteristic described is included in at least one embodiment described herein and does not imply that the feature, structure, or characteristic is present in all embodiments described herein.

FIG. 1 is an illustration of an environment 100 for an example semantic engine 110 for determining semantic tags 127 for one or more documents, such as the documents 105 in a set of documents 107, or one or more other documents 130. The semantic tags 127 determined for each document (e.g., of the documents 105 and/or the document(s) 130) may represent hidden or latent concepts and contexts that are related to the document, but that do not appear in the document itself. The semantic tags 127 determined for each document may be used for a variety of purposes such as index generation and query expansion.

As shown, the semantic engine 110 may include several components including a training engine 115 and a tag engine 125. More or fewer components may be supported. The semantic engine 110, including the training engine 115 and the tag engine 125, may be implemented together or separately using one or more general purpose computing devices such as the computing device 400 illustrated with respect to FIG. 4.

In general, a document (such as a document 105 in the set of documents 107, or a document 130) may include a plurality of terms (e.g., words and phrases). The document(s) may include webpages, papers, publications, and queries. Other types of documents may be supported.

The training engine 115 receives the set of documents 107 and, based on the documents 105 in the set of documents 107, generates a semantic model 117 that may be used to determine semantic tags 127 for the other document(s) 130 or for keywords associated with the other document(s) 130. The other document(s) 130 are not the same as one or more of the documents 105 in the set of documents 107 used to train the semantic model 117.

The training engine 115 may generate the semantic model 117 from the set of documents 107. The documents 105 in the set of documents 107 may be related to the same general topic or field. For example, the documents 105 in the set of documents 107 may be research papers in the field of evidence-based medicine. In another example, the documents 105 in the set of documents 107 may be movie reviews. Any document topic, field, or domain may be supported.

The training engine 115 may generate the semantic model 117 using training data. The training data may include the documents 105 of the set of documents 107, and one or more labels. The labels may be semantic tags 127 determined for some or all of the documents 105.

In some embodiments, the semantic model 117 may be trained by the training engine 115 using a variety of methods and techniques including, but not limited to, doc$_2$vec, Deep Averaging, sequential models such as Long short-term memory ("LSTM"), gated recurring units ("GRU"), bidirectional GRU ("BiGRU"), and bidirectional LSTM ("BiLSTM"), with attention and self-attention. Other methods for training models may be used.

The training process may include two phases. A first phase for generating keywords for documents 105 for the training of input representations, and the second phase for inference to achieve term transfer for generating the semantic tags 127 for each document 105 in the set of documents 107.

As part of the first phase, the training engine 115 may generate a set of k keywords for each query document 105 $d_q$ in the set of documents D={$d_1$, $d_2$, $d_n$}. The keywords generated for a document 105 may be the most relevant terms from the plurality of terms that are included in the document 105. In some embodiments, the keywords may be selected for a document 105 using term scoring methods such as term frequency-inverse document frequency ("TFIDF"). In TFIDF, each term in a document 105 receives a score that indicates its relevance or importance to the document 105. The k terms of the document 105 with the highest scores may be selected as the keywords for the document 105. The number of keywords k determined for each document 105 may be set by a user or administrator.

In some embodiments, the training engine 115 may first learn the appropriate feature representations (i.e., keywords) of the documents 105 in the set of documents 107 in the first phase of training, by taking in the tokens (i.e., terms) of an input document 105 sequentially, using a document's predetermined top k TFIDF-scored terms as pseudo-class labels for an input instance (i.e., prediction targets for a sigmoid layer for multi-label classification). The training objective is to maximize probability for these k terms, or $y_p=(t_1, t_1, \ldots t_k)\in V$ using equation 1:

$$\arg\max_\theta P(y_p=(t_1,t_1,\ldots t_k)\in V|v;\theta) \quad (1)$$

In the equation 1, V may be the list of the top 10,000 TFIDF-scored terms of the corpus of terms in the set of documents 107, v may be the TFID-scored terms associated with a document 105 of the set of documents 107, and t may be a term from a document 105. The training engine 115 may train the semantic model 117 with a label vector including the top 10,000 TFIDF-scored terms as targets for a sigmoid classification layer, employing a couple of alternative training objectives. Other size vectors may be used depending on the number of documents 105 in the set of documents 107.

The first training objective used by the training engine 115 may be to minimize a categorical cross-entropy loss for a single training instance with ground-truth label set using the following equation 2:

$$L_{CE}(\hat{y}_p) = \Sigma_{i=1}^{|V|} y_p \log(\hat{y}_i) \quad (2)$$

In order to predict semantic tags 127 for a document 130, the training engine 115 may further use a language model-based loss objective to convert the decoder to a neural language model. According, the training engine 115 may use a training objective that maximizes the conditional log likelihood of the label terms $L_d$ of a document $d_q$ representation in v, i.e., $P(L_d|d_q)$ where $y_p=L_d\in V$. This amounts to minimizing the negative log likelihood of the label representations conditioned on the document encoding as shown in equation 3:

$$P(L_d|d_q) = \Pi_{l\in L_d} P(l|d_q) = -\Sigma_{l\in L_d} \log P(l|d_q) \quad (3)$$

Because $P(l|d_q) \propto \exp(v_l \cdot v)$ where $v_l$ and v are the label and document encodings, equation 3 is equivalent to minimizing equation 4:

$$L_{LM}(\hat{y}_p) = -\Sigma_{l\in L_d} \log(\exp(v_l \cdot v)) \quad (4)$$

The training engine 115 may train the semantic model 117 using the set of documents 107 and the equations 2 and 4 described above. Alternatively, or additionally, the training engine 115 may train the semantic model 117 using a summation of both equations and a hyper-parameter a that is used to tune the language model component of the total loss objective. Other methods for training a model may be used.

The tag engine 125 may generate one or more semantic tags 127 for a document, such as one of the document(s) 130. The tag engine 125 may receive the document 130 and may use the semantic model 117 to generate the one or more semantic tags 127. The document 130 may be related to the set of documents 107 that was used to train the semantic model 117. For example, if the set of documents 107 were journal articles in a topic such as physics, the document 130 may also be a journal article in the topic of physics.

In some embodiments, the tag engine 125 may generate semantic tags 127 for a document 130 using the semantic model 117. In particular, the tag engine 125 may generate the semantic tags 127 for the document 130 without first determining any keywords.

The semantic engine 110 and semantic tags 127 as described herein can be used for a variety of applications. Once such application is query expansion. A particular set of documents 107 is used to train a semantic model 117 as described above. When a query is received by a search engine associated with the set of documents 107 from a user, the terms of the query are treated as document keywords and are used by the semantic model 117 to generate one or more semantic tags for some or all of the terms of the query. The query is then expanded by adding the semantic tags 127 to the original terms of the query. The expanded query is used by the search engine to search the set of documents 107. As may be appreciated, this is an improvement to prior art searching methods because it is not necessary for the user to understand all of the terms of art or specific terms used in the set of documents 107 when formulating their initial query.

Another application for the semantic engine 110 is generating an index for a set of documents 107. An index may be initially created for the documents 105 of a set of documents 107. The index may include an entry for each keyword along with a link or reference to each document 105 that is associated with the keyword. After the index is created, the semantic model 117 may be used to determine the semantic tags associated with each document 105. The determined semantic tags 127, and references to their associated documents 105, may be added to the index. Where the semantic tags 127 match one or more of the keywords already in the index, references to the documents 105 associated with the semantic tags 127 may be added to the existing entries of the matching keywords.

Figure 2:
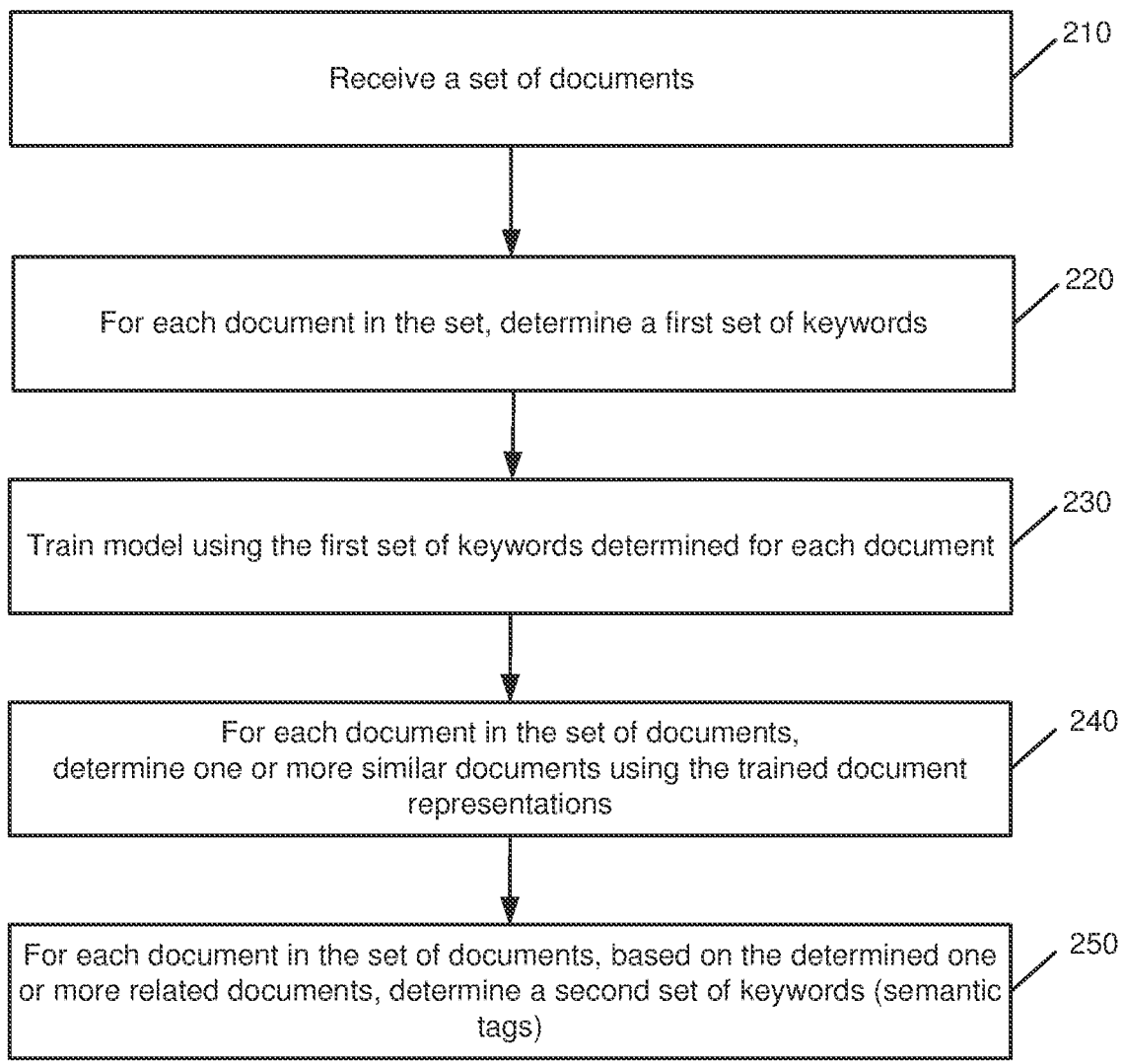
FIG. 2 is an illustration of an example method for training a model to generate semantic tags for documents.

FIG. 2 is an illustration of an example method 200 for training a model to determine semantic tags for documents. The method 200 may be implemented by the semantic engine 110, for example.

At 210, a set of documents is received. The set of documents 107 may be received by the training engine 115 of the semantic engine 110. The documents 105 in the set of documents 107 may be related documents 105. For example, the set of documents 107 may include documents 105 such as medical research papers, political articles, legal documents, or messages in a social networking application. Other types of documents 105 may be supported.

At 220, for each document in the set of documents, a first set of keywords is determined. The first set of keywords for each document 105 in the set of documents 107 may be determined by the training engine 115. The first set of keywords determined for a document 105 may be one or more terms from the document 105 that relate to the topic and/or main point of the document 105.

In some embodiments, the training engine 115 may determine the first set of keywords for a document 105 by scoring each term in the document 105 and selecting the highest scoring terms as the keywords for the document 105. The score for each term may be calculated using a scoring function such as TFIDF. Other scoring functions may be used. Alternatively, the keywords in the first set of keywords may be determined by a reviewer or may have been provided by an author of the document 105.

At 230, a model is trained using the first keywords determined for each document. The model may be the semantic model 117 and may be trained by the training engine 115. Depending on the embodiment, the semantic model 117 may be a neural language model. Other types of models may be supported. The semantic model 117 may be adapted to receive a document 130 (i.e., a document that may not have been in the set of document 107 used to train the model 117) and to output a set of semantic tags 127 for the document 130. The semantic tags 127 may be terms that do not necessarily appear in the document 130 (or keywords associated with the document 130), but that have been determined to be relevant to the document 130.

At 240, for each document in the set of documents, one or more similar documents are determined. The similar documents 105 may be determined by the training engine 115 using trained document representations. In some embodiments, the training engine 115 may determine documents 105 from the set of documents 107 that are similar to a particular document 105 by calculating the similarity of the particular document 105 to each of the other documents 105 in the set of documents 107. The top k most similar documents 105 may be selected as the one or more similar documents 105. The size of k may be set by a user or administrator. The similarly of documents 105 may be calculated using a cosine similarity function. Other similarity functions may be used. Alternatively, the similar documents 105 may be identified by a reviewer or administrator.

At 250, for each document in the set of documents, based on the determined one more similar documents, a second set of keywords is determined. The tag engine 125 may determine the second set of keywords for a document 105 from the first set of keywords associated with each of the documents 105 that were determined to be similar to the document 105. The terms in the second set of keywords are the semantic tags 127 for the document 105. Generally, for each document 105, the terms in the second set of keywords are different than the terms in the first set of keywords for the document 105.

Figure 3:
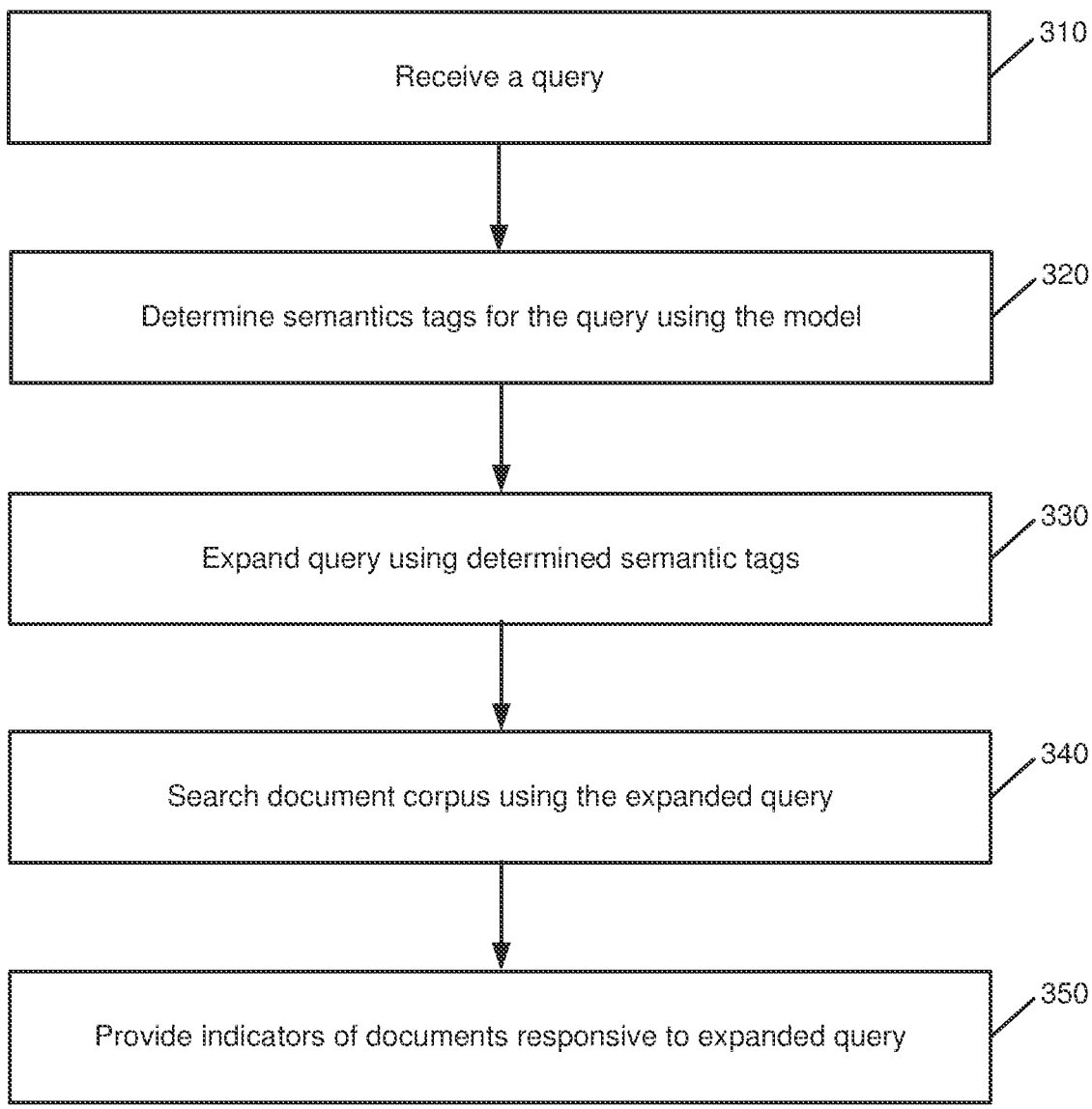
FIG. 3 is an illustration of an example method for using a semantic model to expand a query.

FIG. 3 is an illustration of an example method 300 for expanding a query using semantic tags. The method 300 may be implemented by the tag engine 125 of the semantic engine 110.

At 310, a query is received. The query may be received by the tag engine 125 of the semantic engine 110. The query may have been provided by a user searching for a document 105 that matches the query. The query may include one or more terms (e.g., words or phrases) that that the user believes will match one or relevant documents 105.

At 320, one or more semantic tags are determined for the query. The one or more semantic tags 127 may be determined by the tag engine 125 using the semantic model 117. In some embodiments, the semantic model 117 may have been trained using keywords associated with one or more documents 105 in a particular field, topic, interest, or domain. The query may be for documents 105 in the same field that was used to train the model 117.

The semantic tags 127 determined by the model 117 may be one or more terms that, while they did not appear in the query, are likely relevant to the terms of the query. For example, the semantic tags 127 may include "terms of art" or new terms that are being used in the field or topic associated with the query that the user may not be aware of.

At 330, the query is expanded using the determined semantic tags. The query may be expanded by the tag engine 125. The query may be expanded by adding the semantic tags to the query. Depending on the embodiment, each semantic tag may correspond to one or more of the terms of the original query. The tag engine 125 may then expand the query by adding each semantic tag 127 to its corresponding term of the query along with an "OR" operator so that either the original term of the query or its corresponding semantic tag 127 may match a document 105. Other methods for expanding a query may be used.

At 340, a document corpus is searched using the expanded query. The document corpus may be searched by the tag engine 125 for documents 105 that are responsive to the expanded query. Depending on the embodiment, a document 105 in the corpus may be responsive to the expanded query if it includes any of the terms of the original query or the semantic tags 127, or if it includes a particular combination of terms and semantic tags 127 defined by one or more operators (e.g., Boolean operators) in the expanded query.

At 350, indicators of documents that are responsive to the expanded query are provided. The indicators may be provided to the user that provided the original query by the tag engine 125. In some embodiments, the indicators may be provided along with the original received query and the expanded query that was used to search the document corpus.

Figure 4:
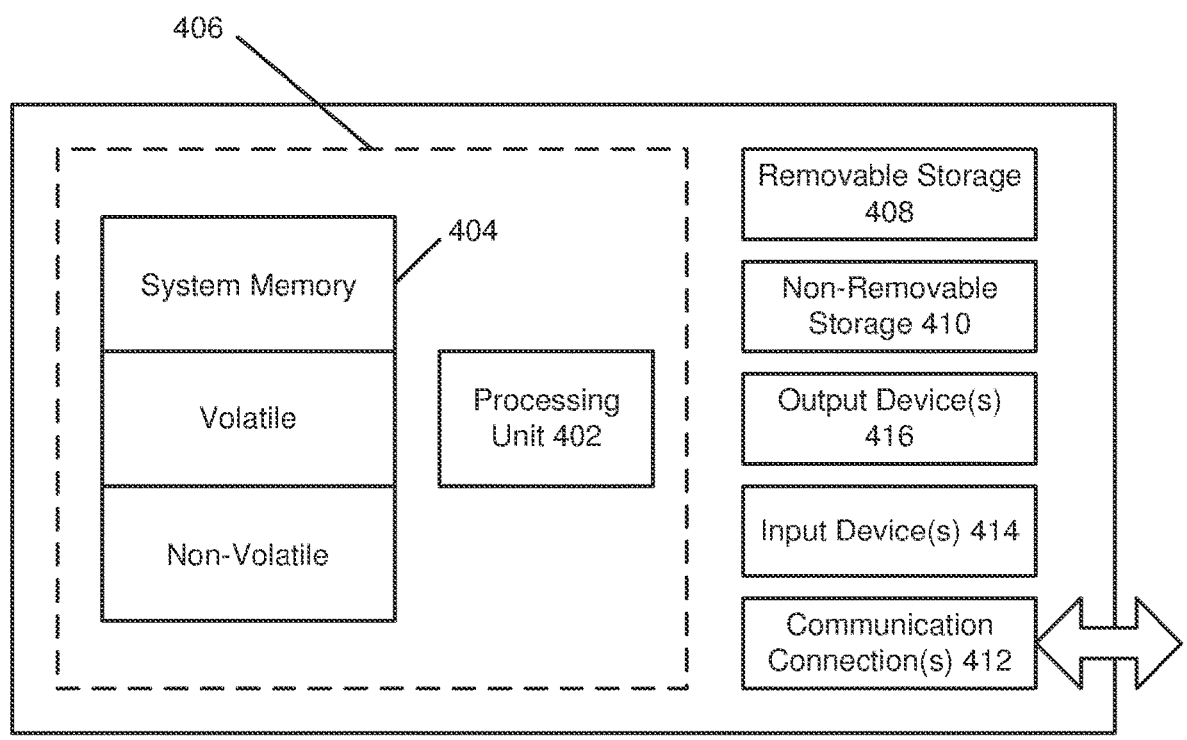
FIG. 4 shows an exemplary computing environment in which example embodiments and aspects may be implemented.

FIG. 4 shows an exemplary computing environment in which example embodiments and aspects may be implemented. The computing device environment is only one example of a suitable computing environment and is not intended to suggest any limitation as to the scope of use or functionality.

Numerous other general purpose or special purpose computing devices environments or configurations may be used. Examples of well-known computing devices, environments, and/or configurations that may be suitable for use include, but are not limited to, personal computers, server computers, handheld or laptop devices, multiprocessor systems, microprocessor-based systems, network personal computers (PCs), minicomputers, mainframe computers, embedded systems, distributed computing environments that include any of the above systems or devices, and the like.

Computer-executable instructions, such as program modules, being executed by a computer may be used. Generally, program modules include routines, programs, objects, components, data structures, etc. that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

With reference to FIG. 4, an exemplary system for implementing aspects described herein includes a computing device, such as computing device 400. In its most basic configuration, computing device 400 typically includes at least one processing unit 402 and memory 404. Depending on the exact configuration and type of computing device, memory 404 may be volatile (such as random access memory (RAM)), non-volatile (such as read-only memory (ROM), flash memory, etc.), or some combination of the two. This most basic configuration is illustrated in FIG. 4 by dashed line 406.

Computing device 400 may have additional features/functionality. For example, computing device 400 may include additional storage (removable and/or non-removable) including, but not limited to, magnetic or optical disks or tape. Such additional storage is illustrated in FIG. 4 by removable storage 408 and non-removable storage 410.

Computing device 400 typically includes a variety of computer readable media. Computer readable media can be any available media that can be accessed by the device 400 and includes both volatile and non-volatile media, removable and non-removable media.

Computer storage media include volatile and non-volatile, and removable and non-removable media implemented in any method or technology for storage of information such as computer readable instructions, data structures, program modules or other data. Memory 404, removable storage 408, and non-removable storage 410 are all examples of computer storage media. Computer storage media include, but are not limited to, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 400. Any such computer storage media may be part of computing device 400.

Computing device 400 may contain communication connection(s) 412 that allow the device to communicate with other devices. Computing device 400 may also have input device(s) 414 such as a keyboard, mouse, pen, voice input device, touch input device, etc. Output device(s) 416 such as a display, speakers, printer, etc. may also be included. All these devices are well known in the art and need not be discussed at length here.

It should be understood that the various techniques described herein may be implemented in connection with hardware components or software components or, where appropriate, with a combination of both. Illustrative types of hardware components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc. The methods and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium where, when the program code is loaded into and executed by a machine, such as a computer, the machine becomes an apparatus for practicing the presently disclosed subject matter.

As used herein, the terms "can," "may," "optionally," "can optionally," and "may optionally" are used interchangeably and are meant to include cases in which the condition occurs as well as cases in which the condition does not occur.

Ranges can be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed.

It should be understood that the various techniques described herein may be implemented in connection with hardware components or software components or, where appropriate, with a combination of both. Illustrative types of hardware components that can be used include Field-Programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc. The methods and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium where, when the program code is loaded into and executed by a machine, such as a computer, the machine becomes an apparatus for practicing the presently disclosed subject matter.

Although exemplary implementations may refer to utilizing aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be effected across a plurality of devices. Such devices might include personal computers, network servers, and handheld devices, for example.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A method for training a semantic model to generate semantic tags for a document, the method comprising:
   receiving a set of documents by a computing device, wherein each document in the set of documents comprises a first set of keywords that are one or more terms from the set of documents that relate to a topic associated with the set of documents;
   training the semantic model by:
      in a first training phase, (i) generating a keyword set for each document in the set of documents, wherein each keyword set comprises a predetermined user-selected number of keywords, and (ii) using each keyword set as a pseudo-class label for an input instance for training of input representations, wherein a first training objective is to maximize a probability for each of a plurality of top k terms in each keyword set, and wherein a second training objective is to minimize a categorical cross-entropy loss for each training instance, and
      in a second training phase, generating, using a language model-based loss objective, inferences to achieve term transfer for generating the semantic tags;
   for each document in the set of documents, determining, by the computing device, one or more documents of the set of documents that are similar to the document by the computing device;
   for each document in the set of documents, based on the one or more documents that are similar to the document, determining, by the computing device and using the trained semantic model, a second set of keywords from the first set of keywords; and
   outputting, by the computing device, the second set of keywords as the semantic tags for the document,
   wherein the semantic tags represent hidden concepts or context relationships in the set of documents, but do not appear in each document in the set of documents,
   and wherein the first set of keywords and the second set of keywords are used to perform expanded search queries by adding the semantic tags to a corresponding query term that includes at least one term associated with the set of documents.

2. The method of claim 1, wherein, for each document, the second set of keywords is different than the first set of keywords.

3. The method of claim 1, further comprising:
receiving a document, wherein the document is not in the first set of documents; and
determining one or more semantic tags for the document using the semantic model.

4. The method of claim 1, wherein each document of the set of documents comprises a plurality of terms, and further comprising, for each document of the set of documents, generating the first set of keywords by:
computing a frequency for each term of the plurality of terms; and
selecting the first set of keywords from the terms of the plurality of terms based on the computed frequencies.

5. The method of claim 4, wherein computing the frequency for a term comprises computing a term frequency—inverse document frequency ("TFIDF") for the term.

6. The method of claim 1, wherein for each document of the set of documents, determining the second set of keywords for the document comprises determining keywords from the first set of keywords associated with each of the one or more similar documents that are not in the first set of keywords associated with the document, and generating the second set of keywords based on the determined keywords.

7. The method of claim 1, wherein determining one or more documents of the set of documents that are similar to the document comprises determining the one or more documents using a cosine similarity-based function.

8. A system for training a semantic model to generate semantic tags for a document, comprising:
at least one computing device; and
a memory storing instructions that when executed by the at least one computing device cause the at least one computing device to:
receive a set of documents, wherein each document in the set of documents comprises a first set of keywords that are one or more terms from the set of documents that relate to a topic associated with the set of documents;
train the semantic model by:
in a first training phase, (i) generate a keyword set for each document in the set of documents, wherein each keyword set comprises a predetermined user-selected number of keywords, and (ii) use each keyword set as a pseudo-class label for an input instance for training of input representations, wherein a first training objective is to maximize a probability for each of a plurality of top k terms in each keyword set, and wherein a second training objective is to minimize a categorical cross-entropy loss for each training instance, and
in a second training phase, generate, using a language model-based loss objective, inferences to achieve term transfer for generating the semantic tags;
for each document in the set of documents, determine one or more documents of the set of documents that are similar to the document;
for each document in the set of documents, based on the one or more documents that are similar to the document, determine, using the trained semantic model, a second set of keywords from the first set of keywords; and
output the second set of keywords as the semantic tags for the document,
wherein the semantic tags represent hidden concepts or context in the set of documents, but do not appear in each document in the set of documents; and
wherein the first set of keywords and the second set of keywords are used to perform expanded search queries by adding the semantic tags to a corresponding query term that includes at least one term associated with the set of documents.

9. The system of claim 8, wherein, for each document, the second set of keywords is different than the first set of keywords.

10. The system of claim 8, further comprising instructions that when executed by the at least one computing device cause the at least one computing device to:
receive a document, wherein the document is not in the first set of documents; and
determine one or more semantic tags for the document using the trained semantic model.

11. A non-transitory computer-readable medium storing instructions that when executed by at least one computing device cause the at least one computing device to:
receive a set of documents, wherein each document in the set of documents comprises a first set of keywords that are one or more terms from the set of documents that relate to a topic associated with the set of documents;
train a semantic model by:
in a first training phase, (i) generate a keyword set for each document in the set of documents, wherein each keyword set comprises a predetermined user-selected number of keywords, and (ii) using each keyword set as a pseudo-class label for an input instance for training of input representations, wherein a first training objective is to maximize a probability for each of a plurality of top k terms in each keyword set, and wherein a second training objective is to minimize a categorical cross-entropy loss for each training instance, and
in a second training phase, generate, using a language model-based loss objective, inferences to achieve term transfer for generating semantic tags;
for each document in the set of documents, determine one or more documents of the set of documents that are similar to the document;
for each document in the set of documents, based on the one or more documents that are similar to the document, determine, using the trained semantic model, a second set of keywords from the first set of keywords as the semantic tags for the document,
wherein the semantic tags represent hidden concepts or context in the set of documents, but do not appear in each document in the set of documents; and
wherein the first set of keywords and the second set of keywords are used to perform expanded search queries by adding the semantic tags to a corresponding query term that includes at least one term associated with the set of documents.

12. The non-transitory computer-readable medium of claim 11, wherein, for each document, the second set of keywords is different than the first set of keywords.

13. The non-transitory computer-readable medium of claim 11, further comprising instructions that when executed by the at least one computing device cause the at least one computing device to:
receive a document, wherein the document is not in the first set of documents; and
determine one or more semantic tags for the document using the trained semantic model.

14. The non-transitory computer-readable medium of claim 11, wherein determining one or more documents of the set of documents that are similar to the document comprises determining the one or more documents using a cosine similarity-based function.

\* \* \* \* \*